July 4, 1972  R. KÖHLER ET AL  3,674,365
PHOTOGRAPHIC PRINTING APPARATUS
Filed Sept. 28, 1970  5 Sheets-Sheet 1

INVENTOR
ROLAND KÖHLER
ERICH NAGEL
FRIEDRICH HUJER
WOLFGANG VIEHRIG
BY

July 4, 1972   R. KÖHLER ET AL   3,674,365
PHOTOGRAPHIC PRINTING APPARATUS
Filed Sept. 28, 1970   5 Sheets-Sheet 5

*INVENTOR*
ROLAND KÖHLER
ERICH NAGEL
FRIEDRICH HUJER
WOLFGANG VIEHRIG

BY

United States Patent Office 3,674,365
Patented July 4, 1972

3,674,365
PHOTOGRAPHIC PRINTING APPARATUS
Roland Köhler, Munich, Erich Nagel, Anzing, and Friedrich Hujer and Wolfgang Viehrig, Munich, Germany, assignors to Agfa-Gevaert Aktiengesellschaft, Leverkusen, Germany
Filed Sept. 28, 1970, Ser. No. 76,069
Claims priority, application Germany, Oct. 22, 1969, P 19 53 015.5
Int. Cl. G03b 27/62
U.S. Cl. 355—40
25 Claims

ABSTRACT OF THE DISCLOSURE

Each film strip has marginal notches that indicate format length of the frames of a film strip. These notches are sensed by feelers that, in one embodiment, actuate switches that control operation of a motor for positioning the masking elements for printing. In another embodiment, a digital circuit in conjunction with the feelers and a pulse generator automatically determine the average format length within a film strip and provides a signal for operating the motor to position the masking elements.

BACKGROUND OF THE INVENTION

The invention relates to apparatus for printing images of exposed and developed frames of different formats, contained on strips of photographic film.

In the U.S. patent application Ser. No. 793,459, filed January 1969, and assigned to the same assignee as the present patent application, there is described apparatus for printing the frames of film strips. In this apparatus the adjustment for each different format length is done by hand.

There has recently been introduced a method for printing in which the individual strips of film are spliced together into a long length, which is rolled up. It is particularly advantageous to splice together the film strips before developing and then to develop the resulting length in a continuous developer. The disadvantage of this method is that the latent image is not visible. With 35 mm. film, having perforations along either edge, and a useful picture width of 24 mm., there are three different formats: 24 x 36, 24 x 24 and 18 x 24 mm. If the film is developed in a continuous developer, account must be taken of the possibility that the film has on it frames of more than one format. Previously, all formats not the usual 24 x 36 mm. were cut from the film, spliced together, and then separately handled. This procedure is very expensive.

SUMMARY OF THE INVENTION

An object of the invention is means for a completely automatic printing of films containing strips of different formats as they come from development.

The invention consists essentially of mask means for defining the effective area of the frame, electric drive means for controlling position of the mask means, and electric circuit means including sensing means, actuated by marks, such as marginal notches, on the film strips, for controlling the operation of the electric drive means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
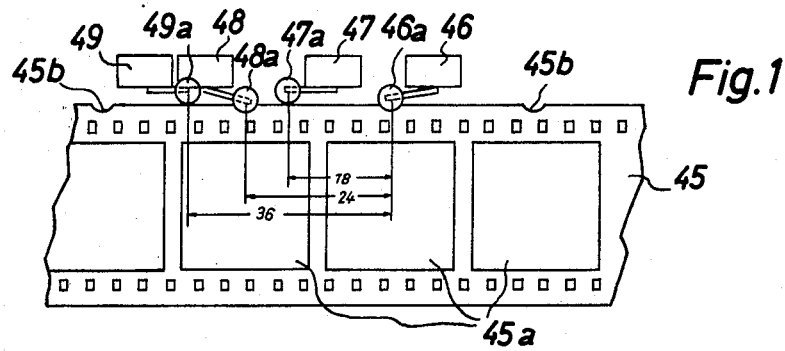
FIG. 1 schematically shows the arrangement of feelers with respect to a strip of film provided with marginal notches.

With reference to FIG. 1, there is shown a film strip 45 containing exposed and developed negative frames 45a, which are to be printed. Each frame 45a has a corresponding mark in the upper edge of the film strip 45. In the particular embodiment shown in FIG. 1, these marks are marginal notches 45b. These notches 45b are located in a fixed position with respect to the frames 45a. They can, for example, be located halfway along the length of the respective frames 45a, as shown in FIG. 1. These notches enable, in a known manner, the automatic stopping of the advance of the film strip 45, whereby the film frames are automatically positioned in the light path of the printer. This manner of operation is particularly advantageous when the film to be printed consists of a number of film strips 45 spliced together and of equal width.

Positioned along the length of the film path are four sensers, such as the feelers 46, 47, 48, and 49, which are provided with rollers 46a, 47a, 48a, and 49a that engage the notches 45b. The feelers are so arranged that the roller 46a is spaced 18 mm. from the roller 47a, 24 mm. from the roller 48a, and 36 mm. from the roller 49a.

Since the marginal notches 45b are spaced apart approximately one format length, the rollers 46a and 47a simultaneously fall into marginal notches when the format is 18 x 24, the rollers 46 and 48 when the format is 24 x 24, and the rollers 46a and 49a when the format is 24 x 36.

Figure 2:
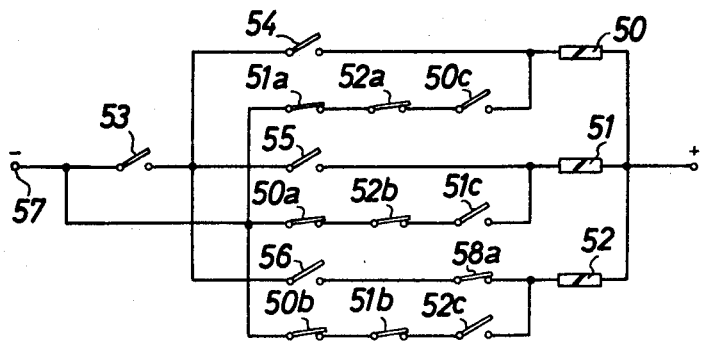
FIG. 2 is a diagram of a circuit operated by the feelers shown in FIG. 1.

FIG. 2 shows a circuit for use with the feeler arrangement shown in FIG. 1. A switch 53, operated by the feeler 46, is connected in the circuit of three parallel connected relays 50, 51, and 52. Connected in series with these relays are switches 54, 55 and 56, which are operated by respective feelers 47, 48, and 49. A relay is connected to the current source 57 when both of the series connected switches in its circuit are closed.

The relays 50, 51 and 52 can also be connected to the current source 57 by shunting the switches 53, 54, 55 and 56 with respective holding circuits. For example, in the circuit of relay 50 are connected two normally closed contacts 51a and 52a of the other two relays, as well as a holding contact 50c, these three contacts being connected in series. A similar holding circuit is provided for each of the other two relays 51 and 52.

Figure 3:
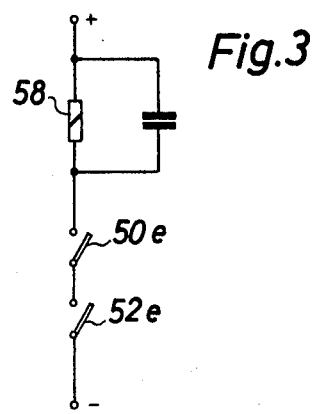
FIG. 3 is a wiring diagram of a circuit for use with the circuit shown in FIG. 2.
Figure 4:
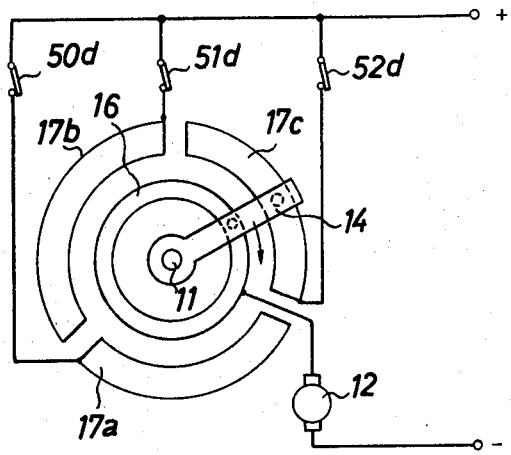
FIG. 4 schematically shows a commutator arrangement for use with the circuit shown in FIG. 2.

As shown in FIG. 4, the relays 50, 51 and 52 control additional normally closed contacts 50d, 51d, and 52d connected in the current circuit of contact segments 17a, 17b and 17c of a commutator for controlling the operation of a positioning motor for the cams of the masking members. The reference numerals and the details of FIG. 4 correspond to FIG. 3 of the U.S. patent application 793,459, filed in January 1969, Group 281. FIGS. 1 and 2 of this patent application show the masks. The spindle 11 of the motor 12 turns the commutator wiper 14, which electrically connects the segments 17a, 17b, and 17c with a contact ring 16 that is connected to the winding of the motor 12. Thus, the wiper 14 is turned until it is moved to one of the segments that is not supplied with current, because the normally closed contact 50d, 51d, or 52d is open.

The arrangement just described operates in the following manner. If the marginal notches 45b are so spaced from each other that, for example, the feeler rollers 46a and 47a simultaneously fall into notches for a brief period of time, the switches 53 and 54 are closed for this period of time, thereby energizing the relay 50. This relay continues to be energized through the holding contact 50c when the film strip 45 is again advanced and the switches 53 and 54 thereby opened. The normally closed contacts 50a and 50b, which are now open in consequence of relay 50 being energized, prevent energization of the relays 51 and 52 until frames of a different format appear. Moreover, since the contact 50d is also open, the commutator segment 17a is without current. After the film strip has been advanced, the masking elements are automatically set in place, while the wiper 14 remains stationary on the commutator segment 17a, because contact 50d is open. With this position of the wiper, the motor spindle 11 has moved the masking element to the correct position, as explained in the aforementioned U.S. patent application 793,459.

If the spacing between feeler roller 46a and another roller is the whole number multiple of that between roller 46a and still another roller, all three rollers will simultaneously fall into notches. This is the case with the 18 and 36 mm. format length. If the 18 mm. format is present, the feeler rollers 46a, 47a, and 49a simultaneously fall into notches 45b. FIG. 3 shows a circuit for insuring correct operation when this occurs. To this end, a relay 58 having a normally closed contact 58a is connected in the current circuit of relay 52. Two normally open contacts 50e and 52e, respectively operated by the relays 50 and 52, are connected in series in the circuit of relay 58. If the film strip 45 has picture notches 45b separated by 18 mm., the switches 53, 54, and 56 simultaneously close, and the relays 50 and 52 are momentarily energized. At the same time the holding circuit of these two relays are opened by the contacts 50b and 52a. The relay 58 is energized through the contacts 50e and 52e, which are now closed, whereby the normally closed contacts 58a in the circuit of relay 52 is opened. Independent of the position of switch 56 the relay 52 is de-energized, the contact 52a in the holding circuit of relay 50 remains closed, and the latter remains energized. To prevent the immediate de-energization of the relay 58 a capacitor 59 is connected in parallel, so that the contact 58a remains open until the switch 56 is again closed by the further advance of the film strip 45.

The described arrangement has the advantage that the positioning of the masking element always corresponds to the format size even if formats of different sizes appear within a single film strip 45. By arranging the sensing means 46 to 49 immediately before or at the printing station, the position of the masking elements is always corrected, if necessary, by the circuits of FIGS. 2 and 4 before exposure is begun. If the spacing between adjacent picture notches 45b is unchanged, the operation of the feelers has no effect, since the corresponding relay 50, 51 or 52 is already energized through its holding circuit. Only when the format changes are the circuits of FIGS. 2 and 4 operated anew. If the sensing means 46 to 49 are positioned at some distance from the printing station, there is required a conventional picture length store arrangement, the information of which is erased by the splice detector.

Figure 7:
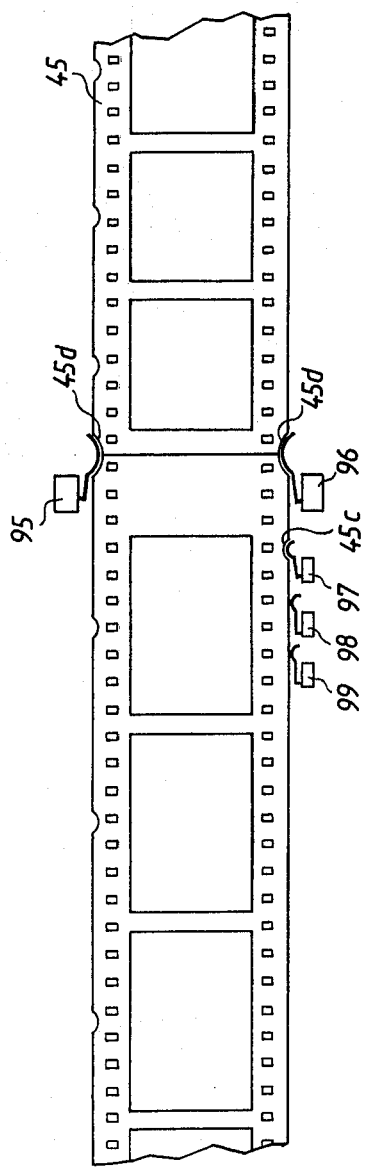
FIG. 7 schematically shows another arrangement of feelers with respect to a strip of film provided with marginal notches.

In FIG. 7 is shown an embodiment in which marks are provided at the beginning of the film strip expressly for controlling the positioning of the masking elements. These marks, as shown in FIG. 7, can be notches of varying spacings or depths located on both edges of the film strip 45. These notches are detected by sensors when a new film strip appears. The sensing is advantageously started by a film strip detector. The sensors are connected to the circuit shown in FIGS. 2 and 4. More particularly, and with reference to FIG. 7, the sensing arrangement comprises two splice detectors, or feelers, 95 and 96 and feelers 97, 98 and 99 that are spaced predetermined distances from the splice feeler 96. The feelers 97, 98 and 99 cooperate with a format notch 45c. The format notches are located in the film edge opposite the edge containing the picture notches 45b. The format notches are shallower than the splice notches 45b, and are spaced from the splice notches a distance uniquely related to the format size. The format notches 45c can be made by hand before the film strip is to be printed. The feelers 97, 98, and 99, which are switches, can be directly connected to the commutator segment 17a, 17b and 17c, provided that the signal for the format size is stored from the time that the splice feeler 96 is actuated by the splice notch 45b until it is again actuated by a splice notch 45d for the following film strip.

Figure 8:
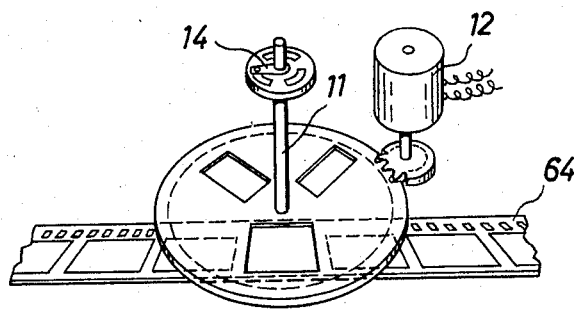
FIG. 8 schemically shows a disc with different negative masks rotatable by a motor in registration in printing position.
Figure 9:
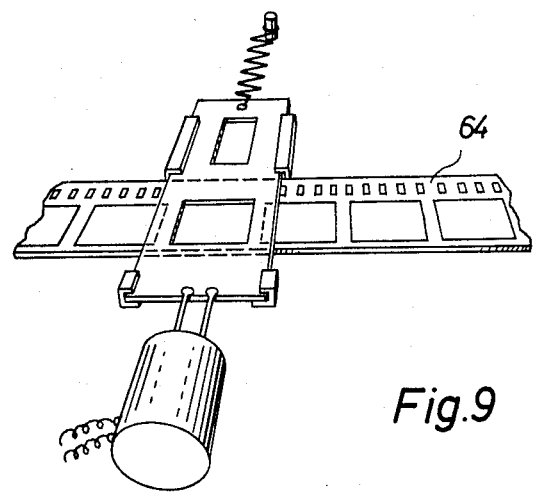
FIG. 9 schematically shows negative masks incorporated in a slide movable by an electromagnet.

The commutator arrangement shown in FIG. 4 can be replaced by other control means for the motor 12. If the motor 12 is a step motor, it can be controlled as a function of the steps already covered. In another embodiment, shown in FIG. 8, the negative masks can be incorporated as fixed frames in a disc that is directly rotated by the motor. In a still further form of the invention shown in FIG. 9, the motor 12 is replaced by electromagnets that operate individual slides that each mount a respective mask and move it to the printing position when the corresponding electromagnet is energized.

Figure 5:
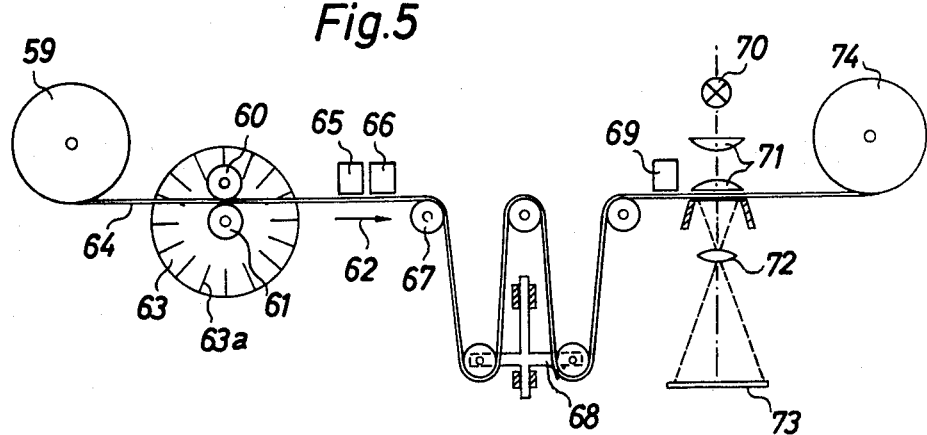
FIG. 5 schematically shows the mechanical arrangement of a second embodiment of the invention.
Figure 6:
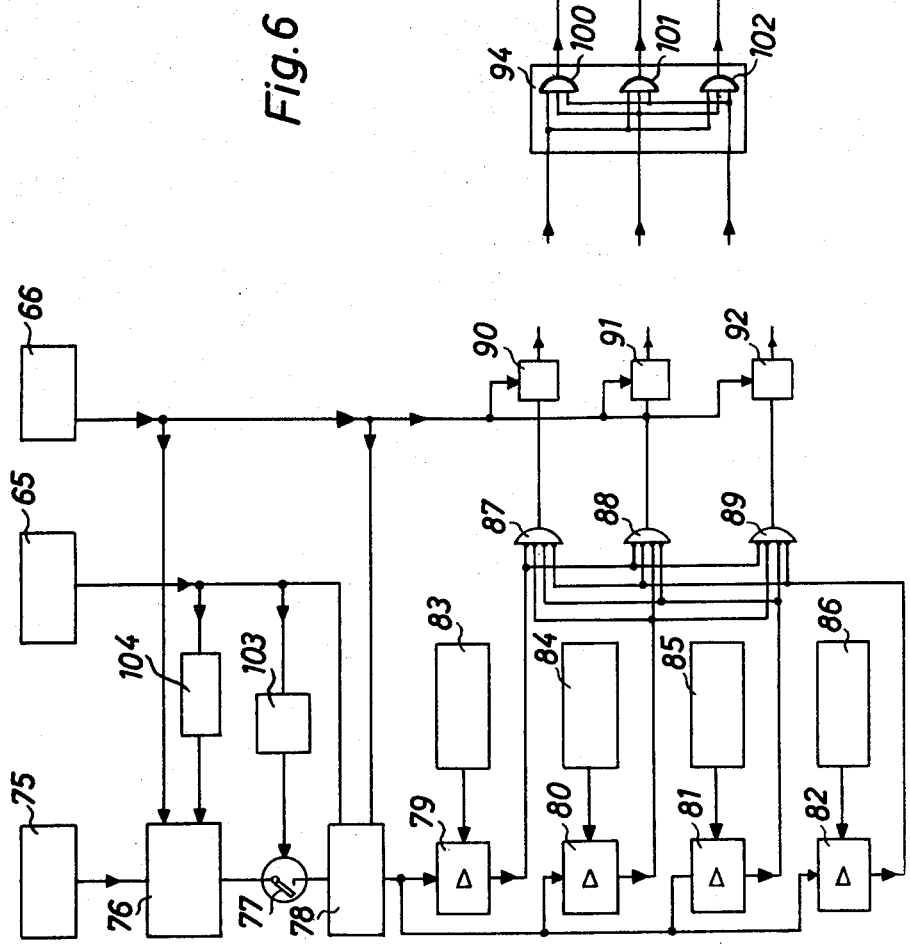
FIG. 6 is a circuit diagram of the second embodiment of the invention.

In the embodiment described in connection with FIGS. 1, 2, 3, and 4 it has been assumed that the spacings between successive picture notches 45b for a given format do not vary greatly. In view of the different camera models, of which the steps of the stepwise advance frequently are out of tolerance, this assumption is often unjustified. Moreover, if the frame is not exposed or is greatly under-exposed, the frame has no picture notch. In order to insure satisfactory printing with film strips effective in this way, the distance between picture notches of frames that can be printed must be statistically determined. An arrangement for doing this is shown in FIGS. 5 and 6. This embodiment correctly reproduces a format of only one size within a given film strip.

FIG. 5 shows a mechanical construction of this embodiment. The reference numeral 59 denotes a role of film consisting of film strips spliced together. The cooperating drive rollers 60 and 61 advance the film in direction of the arrow 62. The drive roller 61 rotates, either directly or through stepup gearing, a disc shutter 63 at a speed corresponding to the velocity at which the film 64 is advanced. The disc shutter 63, which is opaque, is provided along its circumference with a large number of transparent, radially extending slits 63a. There is arranged on one side of the shutter 63 a light source (not shown) and on the other side a photo transducer (not shown), whereby the transducer generates a series of pulses corresponding to the circumferential speed of the shutter 63. Arranged immediately next to the shutter 63 are a feeler arrangement 65 for the picture notches 45b and a feeler arrangement 46 for the film splices. The unit 65 delivers a signal for each picture notch 45b detected. The unit 66 detects the splice between two successive film strips and stops the rollers 60 and 61.

The film 64 next runs through a meandering path formed by the sets of rollers 67 and 68, the lower rollers of which sets are movable to take up the complete length of a film strip. The capacity of this slack compensating device is sufficient to take up the length of the longest film strip and to "store" it immediately in front of the printing station, between the spliced feeler 66 and a second, similar, splice feeler 69. The printing station is indicated by the light source 70, condensers 71, an imaging objective 72, and the printing paper carrier 73. The film 64 is wound up into a spool 74 behind the printing station.

FIG. 6 shows a digital, signal evaluating, circuit for use with the arrangement shown in FIG. 5. The individual components of this digital circuit are designed in accordance with known techniques. Those parts, such as the light source and photo transducer, that cooperate with the shutter 63 to produce a train of pulses corresponding to the length of the film strip are represented by the box 75. The pulses from this pulse generator are conducted by a counter 76, which is reset to zero, after a delay of two pulses, by the splice detector 66 and, after a delay of one pulse, by the picture notch detector 65. Immediately after the counter 76 is reset to zero it begins to count the pulses of the next train. The box 103 indicates delay means for delaying the picture notch signal by one pulse, and the box 104 represents means for delaying the splice pulse by two pulses from the pulse generator 63. In this way the following operations are obtained from a picture notch pulse.

(a) The intermediate store 78 is erased.
(b) One pulse later the gate 77 is closed to conduct the signal from the counter 76 to the store 78.
(c) An additional pulse later the counter 76 is reset to zero, so that the pulses from the pulse generator 73 for the next film strip can be counted. This new train of pulses will produce the signal for the length of the film strip.

The gate 77 is controlled by the picture notch detector 65. The contents of the intermediate store 78 can be erased by both the picture notch detector 65 and the splice detector 66. The signals contained in the intermediate store 78 are conducted to a series of similar comparators 79, 80, 81 and 82 which each compare the signal with a different standard value contained in a respective store 83, 84, 85, and 86. These standard values are such that they correspond to the limiting value of two neighboring groups of step lengths of the formats. Depending upon the result obtained from the comparators 79 to 82, one of the gates 87, 88, or 89 delivers a picture length pulse. Thus, the output of gate 87 delivers a length pulse if the signal stored in the store 78 is greater than the standard value of the store 83 but smaller than the standard values of the store 84, 85, and 86. The gate 88 delivers a length signal if the value of the signal in store 78 is greater than the standard values stored in the stores 83 and 84 but smaller than the standard values stored in the stores 85 and 86. Finally, the output of gate 79 delivers a length signal when the distance between successive notches is greater than the standard values in the stores 83 to 85 but smaller than the standard vaue in store 86. The output of each of the gates 87, 88, and 89 is connected to a respective format frequency store 90, 91, and 92. The store 90 corresponds to the format 18 x 24, the store 91 to the format 24 x 24, and the store 92 to the format 24 x 36. These three format frequency stores are connected to a comparator 94. The comparator 94 has three gates 100, 101 and 102, the gate 100 delivering a pulse when the signal of store 90 is greater than the signals of stores 91 and 92, the gate 101 giving a signal when the signal of store 91 is greater than the signals of stores 90 and 92, and the gate 102 generating a signal when the signal of store 92 is greater than the signals stored in the stores 90 and 91.

The function of these gates is very similar to that of the gates 87, 88, and 89. The contents of the three stores 90 to 92 are continuously compared by the comparator 94 and, depending on the frequency distribution in the stores, the picture format signal is delivered by the circuit 93 when the latter also conducts the splice signal. In other words, the picture format signal is delivered before the film strip enters the printing station. The picture format signal insures that the correct commutator segments 17a to 17c (shown in FIG. 4) are connected to the current source.

The gate in comparator 94 can be directly connected to the respective format frequency stores 90, 91, and 92. Since the current for the motor 12 flows directly through the commutator segments 17a, 17b, and 17c, amplifiers are connected between these segments and the gates of the circuit 93. The purpose of circuit 93 is to open all of its gates upon receiving a signal from the splice detector 69. Then the length signal from the comparator 94 is conducted to the corresponding gate 93, and this gate closed until the next pulse from the detector 69, reopening all of the gates of 93. That one gate of 93 is closed, for each film strip, which receives a signal from the comparator 94. The function of these gates in 93 can be assumed, for example, by bistable multivibrators.

The arrangement described operates in the following manner. Film drawn from the roll 59 is advanced by the drive rollers 60 and 61 until the splice notch reaches the splice notch feeler unit 66. The rollers 60 and 61 are then stopped until the splice detector unit 69 causes the previous film strip to enter the printing station and the correct positioning of the masking elements. While the previous film strips is being printed, the drive rollers 60 and 61 are started up to carry out the sensing cycle of the next film strip. A picture, or frame, length signal, corresponding to the results of the comparison, is conducted through the comparators 79 to 82 to the stores 90 to 92. The stores 90 to 92 are erased by the splice detector 69 at the beginning of a new film strip, so that only signals of the film strip just sensed are held in the stores. Until the splice mark detector 66 delivers a signal, which indicates the end of the film strip and stops the drive rollers 60 and 61, a series of pulses is stored in the stores 90 to 92. With virtually all films an unambiguous maximum is held in that store corresponding to the format of the film strip. When the front end of the film strip reaches the splice detector 69, as a consequence of the printing operation, the slack compensator 67 and 68 stores the entire length of the film strip just sensed. The comparator 94 compares the format frequency stores 90 to 92, and the correct formal signal is conducted through the circuit 93.

The sensing operation should not be any slower than the speed with which the film passes through the printing station, and can be faster because of the presence of the slack compensator 67 and 68. If the spacing between the notch feeler 65 and the light path of the printing station is made shorter than the shortest of the film strips, the sensing operation can occur synchronously with the printing. It is only essential that the length of film between the unit 65 and the printing station is sufficient to permit accurate determination of the formal length on the basis of the spacings between the picture notches. The splice mark detector 66 no longer shuts off the film strip advance. The positioning of the masking element, is, however, controlled, as before, by the splice detector 69.

It is particularly advantageous to use the motor spindle 11 to set the step width of the advance means for the printing paper and to move the cutting marker and the positive masks, as well as cams for positioning the negative masking elements. These arrangements are known in themselves and do not need further explanation.

It will be understood that each of the elements described above, or two or more together, may also find a useful application in other types of circuits and construction differing from the types described above.

While the invention has been illustrated and described as embodied in a photographic printing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and described to be protected by Letters Patent is set forth in the appended claims.

We claim:

1. In an apparatus for reproducing images of exposed frames of different formats on strips of photographic film having marginal notches, a combination comprising mask means for defining the effective area of the frames; electric drive means for controlling the position of said mask means; and electric circuit means including sensing means, said sensing means including splice detecting means and format detecting means, said format detecting means controlling operation of said splice detecting means.

2. A combination as defined in claim 1, wherein said notches comprise splice indicating notches of one depth and format indicating notches of a different depth.

3. A combination as defined in claim 2, wherein a format indicating notch is located at a distance from a splice indicating notch dependent on the frame format of the film strip.

4. In an apparatus for reproducing images of exposed frames of different formats on strips of photographic film having marks, a combination comprising mask means for defining the effective area of the frames; electric drive means for controlling the position of said mask means; and electric circuit means including sensing means actuated by said marks for controlling the operation of said electric drive means, said circuit means comprising a current source, as many relays as there are different size formats for controlling said electric drive means, switch means consisting of a plurality of series connected switch pairs operated by said sensing means and connecting each of said relays to said current source, each said switch pair defining an energizing circuit through which the corresponding one of said relays can be energized, and a holding circuit for each of said relays, each said holding circuit comprising a plurality of series connected, normally closed contacts operated by respective ones of the other said relays and a series connected holding contact operated by the relay of the holding circuit.

5. A combination as defined in claim 4, wherein said sensing means comprises a plurality of discrete sensors, and said switch means consists of discrete switches one more in number than the number of said relays and equal in number to the number of said discrete sensors, each of said discrete switches being operated by a different one of said discrete sensors.

6. A combination as defined in claim 5, wherein one of said discrete switches is connected in series with all the other of said discrete switches.

7. A combination as defined in claim 6, wherein said mask means comprises a plurality of masks, and there are as many said relays as there are said masks, and said electric drive means comprises motor means and commutator means for controlling the operation of said motor means, said commutator means comprising as many commutator segments as there are said masks connected to one pole of said current source, and further including a contact controlled by a respective one of said relays connecting each of said segments to the other pole of said current source.

8. A combination as defined in claim 7, including control means for preventing incorrect operation of said motor means when more than one of said relays are simultaneously energized because the corresponding ones of said discrete sensors are actuated by said marks when the length of a larger format is a whole number multiple of the length of a smaller format.

9. A combination as defined in claim 8, wherein the position of said marks corresponds to the length of the different formats, and said discrete sensors comprise a first discrete sensor and each of the other of said discrete sensors is spaced from said first discrete sensor a distance corresponding to the length of a respective format.

10. A combination as defined in claim 9, wherein said control means comprises relay means, said relay means including a normally closed contact connected in each said energizing circuit of a said relay that is not to be energized when there appears a smaller format of which a larger format is a whole number multiple, a respective normally open contact operated by each of said simultaneously operated relays connected in series with said relay means and closing to energize the latter when said simultaneously operated relays are energized, and delay means for delaying the opening of said relay means to ensure that only the desired one of said relays is energized while the frame is being printed.

11. A combination as defined in claim 10, wherein said delay means includes capacitor means shunted across said relay means.

12. A combination as defined in claim 6, wherein said electric drive means comprises step motor means, and means for controlling said step motor means as a function of the steps executed by the latter.

13. A combination as defined in claim 1, wherein said electric drive means comprises motor means; disc means rotated by said motor means, said disc means controlling the position of said mask means.

14. A combination as defined in claim 7, including disc means rotated by said motor means, said disc means comprising said masks.

15. A combination as defined in claim 1, wherein said electric drive means comprises electromagnet means for positioning said mask means.

16. In an apparatus for reproducing images of exposed frames of different formats on strips of photographic film having marginal picture notches in each film strip spaced apart an amount corresponding to the length of the format in that film strip, a combination comprising mask means for defining the effective area of the frames; electric drive means for controlling the position of said mask means; circuit means comprising sensing means including means for determining the distance between successive notches for controlling the operation of said electric drive means.

17. A combination as defined in claim 16, wherein said means for determining is a digital circuit.

18. A combination as defined in claim 17, including a printing station located after said digital circuit in the direction of advance of the film strip; and slack compensating means located between said digital circuit and said printing station for making up a film strip of any length encountered in practice.

19. A combination as defined in claim 16, including pulse generating means for generating pulses in dependence on the speed of advance of the film-strip; counter means for counting said pulses, and wherein said sensing means includes picture notch sensing means for resetting said counter means to zero.

20. A combination as defined in claim 19, wherein said pulse generating means includes disc shutter means with radial light admitting slits, and film strip drive roller means for rotating said shutter means.

21. A combination as defined in claim 19, wherein said counter means releases a format length signal whenever said picture notch sensing means sets said counter means to zero, and including a plurality of first comparators, there being one more comparator than the number of different size formats, each of said comparators comparing the format length signal from said counter with a respective limiting value; and as many stores as there are different size formats connected to respective ones of said comparators for receiving therefrom pulses.

22. A combination as defined in claim 21, wherein said sensing means includes first splice sensing means; a second comparator controlled by said first splice sensing means for comparing the signals in said stores and producing a format length signal for the film strip.

23. A combination as defined in claim 22, wherein said sensing means includes a second splice sensing means positioned after said first splice sensing means in the direction of film advance, for positioning said mask means in response to said format length signal.

24. A combination as defined in claim 23, including film strip advance means started by said second splice sensing means and stopped by said first splice sensing means.

25. A combination as defined in claim 20, wherein said electric drive means also comprises positioning means for the printing paper advance, for the cutting marker, and for the positive masks.

References Cited

UNITED STATES PATENTS

| 3,490,844 | 1/1970 | Sapp, Jr. | 355—40 |
| 3,377,914 | 4/1968 | Jeffee | 355—41 |

SAMUEL S. MATTHEWS, Primary Examiner

R. A. WINTERCORN, Assistant Examiner

U.S. Cl. X.R.

355—42, 64, 101